United States Patent
Donaldson et al.

(10) Patent No.: US 10,569,524 B2
(45) Date of Patent: Feb. 25, 2020

(54) SYSTEM AND METHOD FOR PROTECTION OF PRINTED IMAGES FORMED ON SURFACES OF THREE-DIMENSIONAL PRINTED OBJECTS

(71) Applicant: Xerox Corporation, Norwalk, CT (US)

(72) Inventors: Patricia J. Donaldson, Pittsford, NY (US); Erwin Ruiz, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 191 days.

(21) Appl. No.: 15/788,235

(22) Filed: Oct. 19, 2017

(65) Prior Publication Data
US 2018/0043676 A1  Feb. 15, 2018

Related U.S. Application Data

(62) Division of application No. 14/569,622, filed on Dec. 12, 2014, now Pat. No. 9,849,661.

(51) Int. Cl.
| B33Y 30/00 | (2015.01) |
| B33Y 10/00 | (2015.01) |
| B33Y 50/02 | (2015.01) |
| B29C 64/112 | (2017.01) |
| B29C 64/386 | (2017.01) |

(52) U.S. Cl.
CPC ............ B33Y 30/00 (2014.12); B29C 64/112 (2017.08); B29C 64/386 (2017.08); B33Y 10/00 (2014.12); B33Y 50/02 (2014.12)

(58) Field of Classification Search
CPC .......... B33Y 30/00; B33Y 50/02; B33Y 10/00
See application file for complete search history.

(56) References Cited

U.S. PATENT DOCUMENTS

| 4,630,076 A | 12/1986 | Yoshimura |
| 4,738,555 A | 4/1988 | Nagashima |
| 5,766,398 A | 6/1998 | Cahill et al. |
| 8,506,038 B2 | 8/2013 | Mizes et al. |
| 2003/0209836 A1 | 11/2003 | Sherwood |
| 2004/0135276 A1 | 7/2004 | Nielsen et al. |
| 2006/0099287 A1 | 5/2006 | Kim et al. |
| 2007/0087564 A1* | 4/2007 | Speakman ........... H01G 9/2031 438/674 |
| 2011/0111125 A1 | 5/2011 | Mantell et al. |
| 2012/0162672 A1 | 6/2012 | Mantell |
| 2013/0065027 A1 | 3/2013 | Mochizuki et al. |
| 2013/0157013 A1 | 6/2013 | Huson et al. |

* cited by examiner

*Primary Examiner* — Joseph A Miller, Jr.
(74) *Attorney, Agent, or Firm* — Maginot Moore & Beck LLP

(57) ABSTRACT

A method of forming a three-dimensional printed object having a printed surface image includes ejecting drops of a build material to form the three-dimensional printed object with a plurality of layers of build material and at least one layer of a transparent material. The method operates ejectors to form a printed image with a marking agent so the printed image can be viewed through the at least one transparent layer. A leveler is applied to a surface of the layer of transparent material but not to the printed image.

14 Claims, 4 Drawing Sheets

SYSTEM AND METHOD FOR PROTECTION OF PRINTED IMAGES FORMED ON SURFACES OF THREE-DIMENSIONAL PRINTED OBJECTS

PRIORITY CLAIM

This application is a divisional application of and claims priority to U.S. patent application Ser. No. 14/569,622, which is entitled "System And Method For Protection Of Printed Images Formed On Surfaces Of Three-Dimensional Objects," which was filed on Dec. 12, 2014, and which issued as U.S. Pat. No. 9,849,661 on Dec. 26, 2017.

TECHNICAL FIELD

This disclosure is directed to three-dimensional object printing systems and, more particularly, to systems and methods of forming printed images on surfaces of objects that are produced in a three-dimensional object printer.

BACKGROUND

Three-dimensional printing, also known as additive manufacturing, is a process of making a three-dimensional solid object from a digital model of virtually any shape. Many three-dimensional printing technologies use an additive process in which successive layers of the part are built on top of previously deposited layers. Some of these technologies use inkjet printing, where one or more printheads eject successive layers of material. Three-dimensional printing is distinguishable from traditional object-forming techniques, which mostly rely on the removal of material from a work piece by a subtractive process, such as cutting or drilling.

Many existing three-dimensional printers form the printed objects using one or more build materials with little or no regard to the appearance of the surface of the object. However, some three-dimensional object printers also form two-dimensional printed images on a surface of the three-dimensional printed objects. The printer forms two-dimensional images on the object to improve the aesthetics of the three-dimensional printed object and to convey information such as printed instructions, part labels, barcodes, and the like.

Printed images that are formed on the surface of a three-dimensional printed object are susceptible to damage both during and after the three-dimensional printing process. Consequently, improved systems and methods for the protection of printed images on the surfaces of three-dimensional printed objects would be beneficial.

SUMMARY

In one embodiment, a method of forming a two-dimensional image on a surface of a three-dimensional printed object has been developed. The method includes operating with a controller a first plurality of ejectors to eject drops of a build material to form the three-dimensional printed object with a plurality of layers of the build material on a support member, applying a leveler to a surface of the three-dimensional printed object after forming each layer in the plurality of layers of the build material, operating with the controller a second plurality of ejectors to eject drops of a marking agent on a surface of the three-dimensional printed object to form a printed image, operating with the controller a third plurality of ejectors to eject drops of a transparent material over the printed image to form a layer of transparent material over the printed image, and applying the leveler to a surface of the layer of transparent material without applying the leveler to the printed image prior to formation of the layer of transparent material over the printed image.

In another embodiment, a three-dimensional object printer that is configured to form a two-dimensional image on a surface of a three-dimensional printed object has been developed. The three-dimensional object printer includes at least one printhead, a leveler, a support member, and a controller operatively connected to the at least one printhead and the leveler. The at least one printhead includes a first plurality of ejectors configured to eject drops of a build material, a second plurality of ejectors configured to eject drops of at least one marking agent, and a third plurality of ejectors configured to eject drops of a transparent material. The controller is configured to operate the first plurality of ejectors to eject drops of the build material to form the three-dimensional printed object with a plurality of layers of the build material on the support member, apply the leveler to a surface of the three-dimensional printed object after forming each layer in the plurality of layers of the build material, operate the second plurality of ejectors to eject drops of the marking agent on a surface of the three-dimensional printed object to form a first printed image, operate a third plurality of ejectors to eject drops of a transparent material over the first printed image to form a first layer of transparent material over the first printed image, and apply the leveler to a surface of the first layer of transparent material without applying the leveler to the first printed image prior to formation of the first layer of transparent material over the first printed image.

In another embodiment, a method of forming a three-dimensional printed object with a printed image using a three-dimensional object printer has been developed. The method includes operating with a controller a first plurality of ejectors to eject drops of a transparent material onto a support member to form a layer of transparent material on the support member, applying a leveler to a surface of the layer of transparent material, operating with the controller a second plurality of ejectors to eject drops of a marking agent onto the surface of the layer of transparent material to form a printed image, operating with the controller a third plurality of ejectors to eject drops of a build material over the printed image to form a layer of build material in a three-dimensional printed object, and applying the leveler to a surface of the layer of the build material without applying the leveler to the printed image prior to formation of the layer of the build material over the printed image.

BRIEF DESCRIPTION OF THE DRAWINGS

The foregoing aspects and other features of an apparatus or printer that generates two-dimensional printed images on a surface of a three-dimensional printed object are explained in the following description, taken in connection with the accompanying drawings.

DETAILED DESCRIPTION

Figure 1:
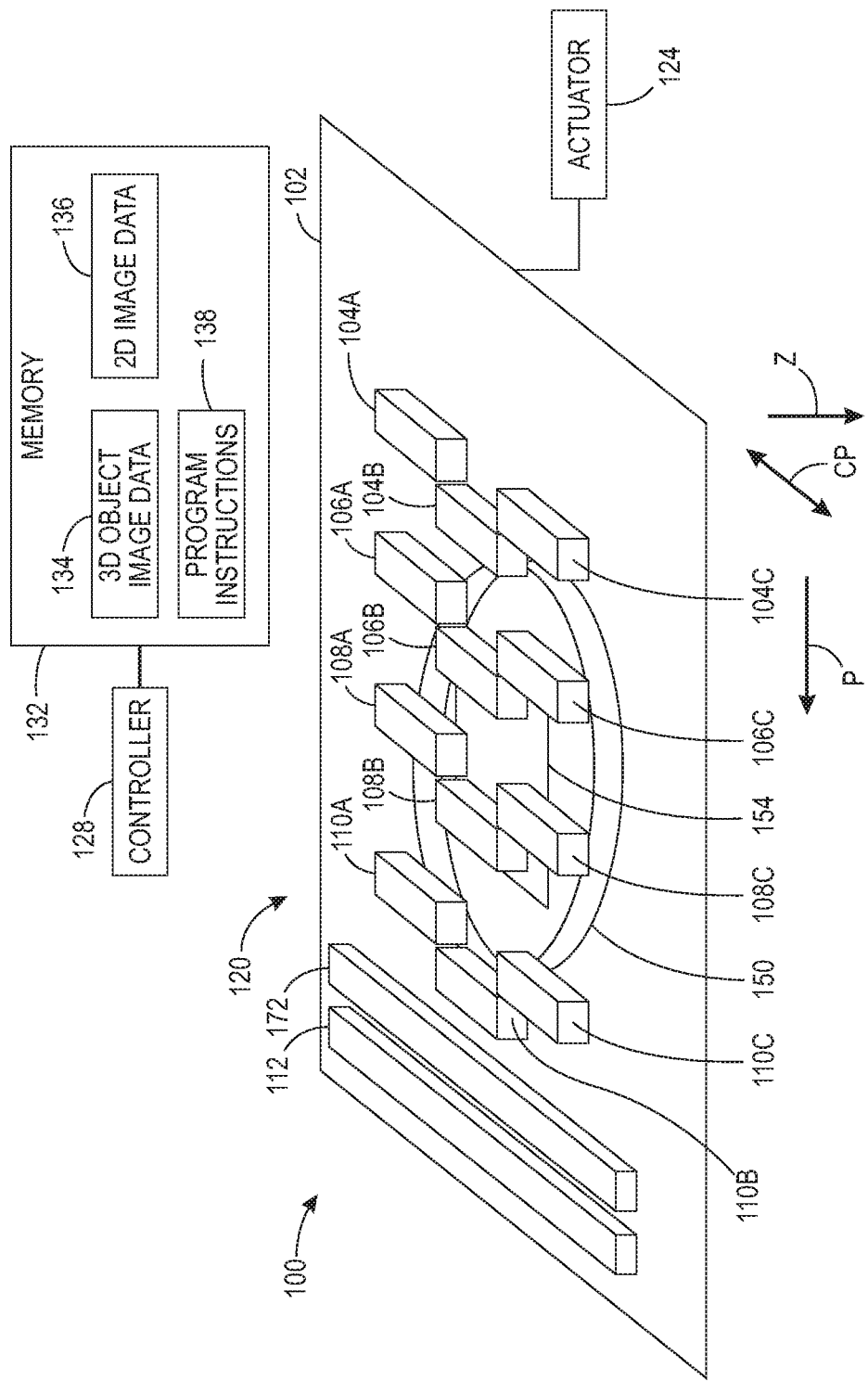
FIG. 1 is a diagram of a three-dimensional object printer.

For a general understanding of the environment for the device disclosed herein as well as the details for the device, reference is made to the drawings. In the drawings, like reference numerals designate like elements.

As used herein, the term "build material" refers to a material that is ejected in the form of liquid drops from a plurality of ejectors in one or more printheads to form layers of material in an object that is formed in a three-dimensional object printer. Examples of build materials include, but are not limited to, thermoplastics, UV curable polymers, and binders that can be liquefied for ejection as liquid drops from ejectors in a printhead and subsequently hardened into a solid material that forms an object through an additive three-dimensional object printing process. Some three-dimensional object printer embodiments employ multiple forms of build material to produce an object. In some embodiments, different build materials with varying physical or chemical characteristics form a single object. In other embodiments, the printer is configured to eject drops of a single type of build material that incorporates different colors through dyes or other colorants that are included in the build material. The three-dimensional object printer controls the ejection of drops of build materials with different colors to form objects with varying colors and optionally with printed text, graphics, or other single and multicolor patterns on the surface of the object.

As used herein, the term "process direction" refers to a direction of movement of a support member past one or more printheads during a three-dimensional object formation process. The support member holds the three-dimensional object during the print process. In some embodiments, the support member is a planar member such as a metal plate, while in other embodiments the support member is a rotating cylindrical member or a member with another shape that supports the formation of an object during the three-dimensional object printing process. In some embodiments, the printheads remain stationary while the support member and object moves past the printhead. In other embodiments, the printheads move while the support member remains stationary. In still other embodiments, both the printheads and the support member move.

As used herein, the term "cross-process direction" refers to a direction that is perpendicular to the process direction and in the plane of the support member. The ejectors in two or more printheads are registered in the cross-process direction to enable an array of printheads to form printed patterns of build material over a two-dimensional planar region. During a three-dimensional object printing process, the printheads eject drops of the build material to form successive layers of build material that form a three-dimensional object.

As used herein, the term "primer material" refers to a material that forms a durable coating over another surface to form an image receiving surface for ink or another marking agent. In some embodiments, the primer is a white material that forms a white background for a printed image, although other primer materials have a wide range of colors in addition to white. The primer forms a surface that promotes the adhesion of marking agents to form printed images on a surface of a three-dimensional printed object.

As used herein, the term "marking agent" refers to any material that can be formed on a surface of an object to form visible marks including monochrome and color printed images that include text and graphics. Examples of marking agents include various forms of ink, including aqueous, solvent based, and phase-change inks. Other forms of marking agent include toner compounds. In some embodiments, the printer forms a printed image including a layer of the marking agent formed over a layer of the primer to promote adhesion and visibility of the marking agent.

As used herein, the term "z-axis" refers to an axis that is perpendicular to the process direction, the cross-process direction, and to the plane of the support member in a three-dimensional object printer. At the beginning of the three-dimensional object printing process, a separation along the z-axis refers to a distance of separation between the support member and the printheads that form the layers of build material in a three-dimensional printed object. As the ejectors in the printheads form each layer of build material, the printer adjusts the z-axis separation between the printheads and the uppermost layer to maintain a substantially constant distance between the printheads and the uppermost layer of the object during the printing operation. In some embodiments, the support member moves away from the printheads during the printing operation to maintain the z-axis separation, while in other embodiments the printheads move away from the partially printed object and support member to maintain the z-axis separation.

FIG. 1 depicts a three-dimensional object printer 100 that is configured to operate printheads to form a three-dimensional printed object 150 and to form a printed image 154 on a surface of the object 150. The printer 100 includes a support member 102, printhead arrays 104A-104C, 106A-106C, 108A-108C, and 110A-110C, an ultraviolet (UV) curing device 112, actuator 124, controller 128, memory 132, and a leveler 172. FIG. 1 depicts the three-dimensional object printer 100 during formation of a three-dimensional printed object 150 from a plurality of layers of the build material using the printhead array 104A-104C. The printer 100 also forms a printed image 154 using the printhead array 110A-110C with a transparent protective layer over the printed image formed using the printhead array 106A-106C.

In the embodiment of FIG. 1, the support member 102 is a planar member, such as a metal plate, that moves in a process direction P. The leveler 172, printhead arrays 104A-104C, 106A-106C, 108A-108C, and 110A-110C; and UV curing device 112, form a print zone 120. The member 102 carries any previously formed layers of build material through the print zone 120 in the process direction P. During the printing operation, the support member 102 moves in a predetermined process direction path P that passes the printheads multiple times to form successive layers of the build material in the object 150, primer layers on the surface of the object 150, and the printed image 154 on the surface of the primer layers on the object 150. In some embodiments, multiple members similar to the member 102 pass the print zone 120 in a carousel or similar configuration. One or more actuators move the member 102 through the print zone 120 in the process direction P. In the embodiment of FIG. 1, an actuator also moves the support member 102 in the direction Z away from the components in the print zone 120 after each layer of build material is applied to the support member 102. The actuator moves the support member 102 in the Z direction to maintain a uniform separation between the uppermost layer of the object 150 and the components in the print zone 120.

In the configuration of FIG. 1, the printhead array 104A-104C ejects drops of a build material toward the surface of the support member 102 to form layers of a three-dimensional printed object, such as the object 150. The printheads 104A-104C are arranged in a staggered configuration to enable a two-dimensional array of ejectors in each printhead to eject drops on a portion of the support member 102. The printheads 104A-104C are arranged in a "stitched" configuration to enable the ejectors in the printheads 104A-104C to form a continuous arrangement of the build material across the support member 102 in the cross-process direction CP. While FIG. 1 depicts an array of three printheads, alternative configurations include a greater or lesser number of printheads.

Each of the printheads 104A-104C includes a plurality of ejectors that receive the build material in a liquefied form and eject liquid drops of the build material. In one embodiment, each ejector includes a fluid pressure chamber that receives the liquid build material, an actuator such as a piezoelectric actuator, and an outlet nozzle. The piezoelectric actuator deforms in response to an electric firing signal and urges the liquefied build material through the nozzle as an ejected drop that travels toward the member 102. If the member 102 bears previously formed layers of a three-dimensional object, then the ejected drops of the build material form an additional layer of the object. Each of the printheads 104A-104C includes a two-dimensional array of the ejectors, with an exemplary printhead embodiment including 880 ejectors. During operation, the controller 128 controls the generation of the electrical firing signals to operate selected ejectors at different times to form each layer of the build material for the object 150. In the printer 100, the controller 128 operates the ejectors in the printheads 104A-104C with reference to the 3D object image data 134 that are stored in the memory 132 to apply the build material.

In the printer 100, the printhead arrays 106A-106C, 108A-108C, and 110A-110C each include three printheads with the same or similar configurations to the printheads 104A-104C, but each of the printhead arrays ejects a different type of material. In the illustrative example of FIG. 1, the ejectors in the printhead array 106A-106C eject drops of a transparent material that forms a protective transparent layer over printed images that are formed on the surface of the object 150. In one embodiment, the transparent material is a transparent phase-change ink that the ejectors in the printheads 106A-106C eject as liquid drops. The transparent phase-change ink solidifies over the printed image 154 in response to the UV radiation from the curing device 112 to form a protective layer of transparent material. The printhead array 108A-108C eject drops of a primer material, such as a white primer material, that form a layer over the surface of the build material to receive drops of a marking agent in a printed image. The printhead array 110A-110C ejects drops of at least one color of marking agent to form printed images on an image receiving surface that is formed from a layer of the primer material on the three-dimensional printed object 150. For example, the ejectors in the printhead array 110A-110C eject drops of cyan, magenta, yellow, and black (CMYK) inks to form multicolor images. FIG. 1 depicts a single printhead array 110A-110C that ejects drops of the marking agent for simplicity, but alternative embodiments include multiple printhead arrays that eject different ink colors to form multicolor printed images.

While FIG. 1 depicts four printhead arrays that eject drops of the build material, transparent material, primer, and colored ink, alternative embodiments can include three or more printhead arrays that form printed objects with additional build materials. Another embodiment includes only a single printhead array. While the printhead arrays 104A-104C, 106A-106C, 108A-108C, and 110A-110C are each depicted as including three printheads, alternative configurations can include few printheads or a greater number of printheads to accommodate print zones with different sizes in the cross-process direction. Alternative embodiments can include additional printhead arrays, such as additional color ink printhead arrays or printhead arrays that emit different types of build material. While the printhead arrays 104A-104C, 106A-106C, 108A-108C, and 110A-110C remain stationary during operation in the printer 100, alternative printer embodiments include one or more printheads that move in the cross-process direction CP, process direction P, or in both the cross-process and process directions to form a three-dimensional printed object.

In the printer 100, the UV curing device 112 is an ultraviolet light source that produces UV light across the print zone 120 in the cross-process direction CP. The UV light from the UV curing device 112 hardens the build material that is formed on the uppermost layer of the object 150 to form a durable portion of the object 150. The UV curing process solidifies the build material to accept additional layers of build material or coatings that form an image receiving surface for a two-dimensional printed image on an exterior of the three-dimensional printed object 150.

As use herein, the term "leveler" refers to a member that is configured to engage the uppermost surface of each layer of the build material before the UV curing device 112 cures the build material. In the printer 100, the leveler 172, which is also referred to as a planarizer, applies a heated surface to the object 150. The heated surface of the leveler 172 softens or melts a portion of the uppermost layer of the build material in the object 150. The leveler 172 also applies pressure to smooth the uppermost layer of build material in the object 150 and form a uniform surface that receives an additional layer of the build material during a subsequent pass through the print zone 120. In some embodiments, the leveler 172 is a roller that is coated with a low surface energy material to prevent adhesion of the build material to the surface of the leveler 172. While the other components in the print zone 120 remain at a predetermined distance in the Z direction from the object 150, the leveler 172 is configured to engage the object 150 to smooth the uppermost layer.

In the configuration of FIG. 1, the leveler 172 engages the uppermost layer of build material, primer or transparent protective material formed in the object 150, but does not engage layers of image marking ink on the surface of the object 150 to enable the printer 150 to form the printed image 154 on the outer surface of the object 150. In one embodiment, the controller 128 operates an actuator to increase the z-axis distance between the support member 102 and the components in the print zone 120 during formation of the printed image to prevent the leveler 172 from engaging the marking agent in the printed image. In another embodiment, the controller 128 operates another actuator that is operatively connected to the leveler 172 to move the leveler 172 out of engagement with the object 150 while the printer 100 forms the printed image 154 on the surface of the object 150.

The actuator 124 is an electromechanical device, such as a stepper motor, that is configured to control the position of the support member 102 along the z-axis. During a three-dimensional printing operation, the actuator 124 adjusts the z-axis position of the support member 102 to maintain a predetermined distance between the upper layer of the printed object 150 and the components in the print zone 120.

As described in more detail below, the actuator 124 moves the support member 102 away from the leveler 172 along the z-axis by a predetermined distance while the printer 100 forms the printed image 154 on the surface of the object 150 to prevent the leveler 172 from engaging the ink in the printed image 154. The actuator 124 also moves the support member 102 toward the leveler 172 along the z-axis after the printer 100 forms a protective layer of transparent material over the printed image to enable the leveler 172 to smooth the transparent material layer. In the printer 100, the controller 128 is operatively connected to the actuator 124.

The controller 128 is a digital logic device such as a microprocessor, microcontroller, field programmable gate array (FPGA), application specific integrated circuit (ASIC) or any other digital logic that is configured to operate the printer 100. In the printer 100, the controller 128 is operatively connected to one or more actuators that control the movement of the support member 102, the printhead arrays including the printhead arrays 104A-104C, 106A-106C, 108A-108C, and 110A-110C, and the UV curing device 112. The controller 128 is also operatively connected to a memory 132. In the embodiment of the printer 100, the memory 132 includes volatile data storage devices such as random access memory (RAM) devices and non-volatile data storage devices such as solid-state data storage devices, magnetic disks, optical disks, or any other suitable data storage devices. The memory 132 stores three-dimensional (3D) object image data 134, two-dimensional (2D) printed image data 136, and stored program instructions 138. The controller 128 executes the stored program instructions 138 to operate the components in the printer 100 to both form the three-dimensional printed object 150 and print two-dimensional images on one or more surfaces of the object 150. The 3D object image data 134 includes, for example, a plurality of two-dimensional image data patterns that correspond to each layer of build material that the printer 100 forms during the three-dimensional object printing process. The controller 128 ejects drops of the build material from the printheads 104A-104C with reference to each set of two-dimensional image data to form each layer of the object 150. The memory 132 also stores two-dimensional image data 136 that correspond to a printed image that the printer 100 forms on the surface of the three-dimensional printed object 150 using one or more colors of marking agent from the printheads in the array 110A-110C.

During operation, the controller 128 operates the ejectors in the printheads 104A-104C to form the three-dimensional printed object 150 from the build material with reference to the three-dimensional image data 134. The leveler 172 engages each layer of the build material in the object 150 as the support member 102 moves the object 150 through the print zone 150 in the process direction P. After printing at least a portion of the three-dimensional printed object 150, the controller 128 operates the ejectors in the printhead array 110A-110C to form the printed image 154 on a surface of the printed object 150. The controller 128 optionally operates the ejectors in the printhead array 108A-108C to form one or more layers of the primer material over the build material in the object 150 prior to forming the printed image with the printhead array 110A-110C.

The controller 128 operates the actuator to move the support member 102 and upper layer of the object 150 away from the leveler 172 along the z-axis to prevent the leveler 172 from contacting the marking agent in the printed image 154. For example, in one embodiment the actuator 124 moves the support member 102 away from the leveler by a distance of approximately 0.5 mm to 1 mm along the z-axis to prevent application of the leveler to the ink in the printed image 154. The actuator 124 also maintains a suitable z-axis distance between the printheads 110A-110C and the object 150 to form the printed image 154.

After forming the printed image 154, the controller 128 operates the printhead array 106A-106C to form a layer of transparent material over the printed image 154. The transparent material solidifies to form a protective layer over the printed image 154. In the printer 100, the controller 128 operates the actuator 124 to move the upper layer of transparent material upward on the z-axis to apply the leveler 172 to the surface of the layer of transparent material. The leveler 172 forms a smooth uniform surface on the layer of transparent material.

Figure 2:
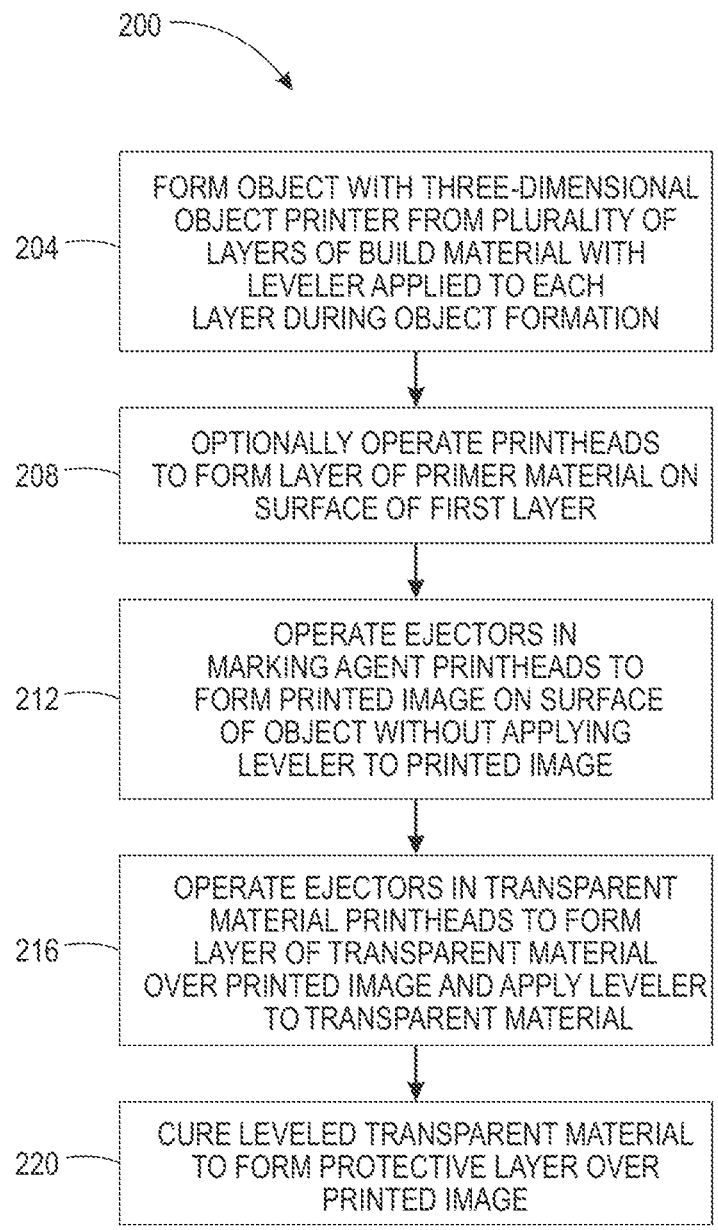
FIG. 2 is a block diagram of a process for operation of a three-dimensional object printer to form two-dimensional images with a protective layer on a surface of a three-dimensional printed object.

FIG. 2 depicts a process 200 for forming a three-dimensional printed object with a two-dimensional image printed on a surface of the object. In the discussion below, a reference to the process 200 performing an action or function refers to the operation of a controller to execute program instructions to perform the task or function in conjunction with other components in a three-dimensional object printer. The process 200 is described in conjunction with the printer 100 of FIG. 1 and the view of the printed object 150 in FIG. 4 for illustrative purposes.

During process 200, the printer 100 forms the three-dimensional printed object 150 from a plurality of layers of the build material and the printer 100 applies the leveler 172 to each layer of the build material to maintain a uniform upper surface for the object 150 (block 204). During operation, the controller 128 operates the ejectors in the printhead array 104A-104C to form each layer of the build material with reference to the three-dimensional object image data 134. The actuator 124 positions the support member 102 and the previously formed layers of build material in the object 150 along the z-axis to enable the leveler 172 to apply heat and pressure to the uppermost layer of build material. The printer 100 forms the plurality of layers and applies the leveler 172 to each layer until the object 150 has formed a surface that can receive the printed image 154. The leveler 172 maintains the upper surface of the object 150 with a uniform height along the z-axis.

The process 200 continues as the printer 100 optionally operates the ejectors in the printhead array 108A-108C to form a layer of the primer material on the surface of the object 150 (block 208). As described above, the printer material forms an image receiving surface for drops of the marking agent, such as ink drops, that form a printed image on the surface of the object 150. Some printer embodiments do not use a primer material and eject drops of the marking agent onto the build material in the object 150 directly.

The process 200 continues as the controller 128 operates the ejectors in the printheads 110A-110C to form the printed image 154 on the surface of the object 150 without applying the leveler 172 to the printed image 154 (block 212). In the printer 100, the controller 128 operates the actuator 124 to move the support member 102 and printed object 150 away from the leveler 172 and other components in the print zone 120 along the z-axis prior to operating the ejectors in the printheads 110A-110C to form the printed image 154 on the surface of the object 150. The uppermost layer of build material in the object 150 forms the image receiving surface for the image 154 in one configuration, or the layer of the primer material forms the image receiving surface in a configuration that use a primer material.

The controller 128 operates the ejectors in the printhead array 110A-110C to form the printed image 154 using one or more of the CMYK inks with reference to the 2D image data 136. The printer 100 also cures the material in the printed image 154 using, for example, the UV light source 112 or by enabling the printed marking agent to dry or solidify on the surface of the object 150. The actuator 124 moves the support member and object 150 away from the leveler 172 by a sufficient distance along the z-axis to prevent the surface of the leveler 172 from being applied to the printed image 154 on the surface of the object 150. The heated surface of the leveler 172 produces smearing or other artifacts in the marking agent that forms printed image 154 if the leveler 172 engages the printed image 154. The controller 128 adjusts the position of the support member 102 along the z-axis to maintain a z-axis separation between the marking agent in the printed image 154 and the leveler 172. In some embodiments, the support member 102 and object 150 pass the printhead array 110A-110C two or more times during a multi-pass printing process to form the printed image 154, and the leveler 172 does not engage the object 150 during the multi-pass printing process.

Process 200 continues as the printer 100 operates the ejectors in the printhead array 106A-106C to form a layer of transparent material over the printed image 154 and applies the leveler 172 to the transparent layer to form a smooth surface for the transparent material layer (block 216). The printer 100 optionally moves the support member 102 through the print zone 120 one or more times to form the layer of transparent material with varying levels of thickness. In some embodiments, the transparent material forms a comparatively thin (e.g. 100 µm to 1 mm) protective layer over the printed images. In other embodiments, the transparent material is also a build material that forms a portion of the printed object, and the printer 100 forms multiple layers of the transparent material having any thickness up to a maximum thickness within the operating parameters of the printer 100. As described above, the transparent material forms a protective layer over the marking agent that forms the printed image 154. The transparent material enables the printed image to remain visible while protecting the printed image 154 from damage through contact with the leveler 172 during the printing process or from other damage that could occur to the finished object 150 after completion of the process 200. In the illustrative embodiment of FIG. 2, the printer 100 applies the leveler 172 to the surface of the transparent material after forming the layer of transparent material and prior to curing the layer with the UV curing device 112 to form a protective layer over the printed image 154. The controller 128 operates the actuator 124 to move the support member 102 and object 150 toward the leveler 172 along the z-axis to apply the heated surface of the leveler 172 to the layer of transparent material after formation of the transparent layer of material over the printed image 154. The leveler 172 applies heat and pressure to the surface of the transparent material to produce a smooth surface of the transparent material layer.

During process 200, the printer 100 also cures the transparent material after the leveler 172 has formed a smooth surface of the transparent material layer (block 220). In the embodiment of FIG. 1, the transparent material is UV curable and the UV curing device 112 applies UV radiation to the transparent material on the surface of the object 150 to cure the transparent material. The curing device 112 applies UV radiation to harden the smoothed surface of the transparent material layer to form a durable protective coating over the printed image.

Figure 3:
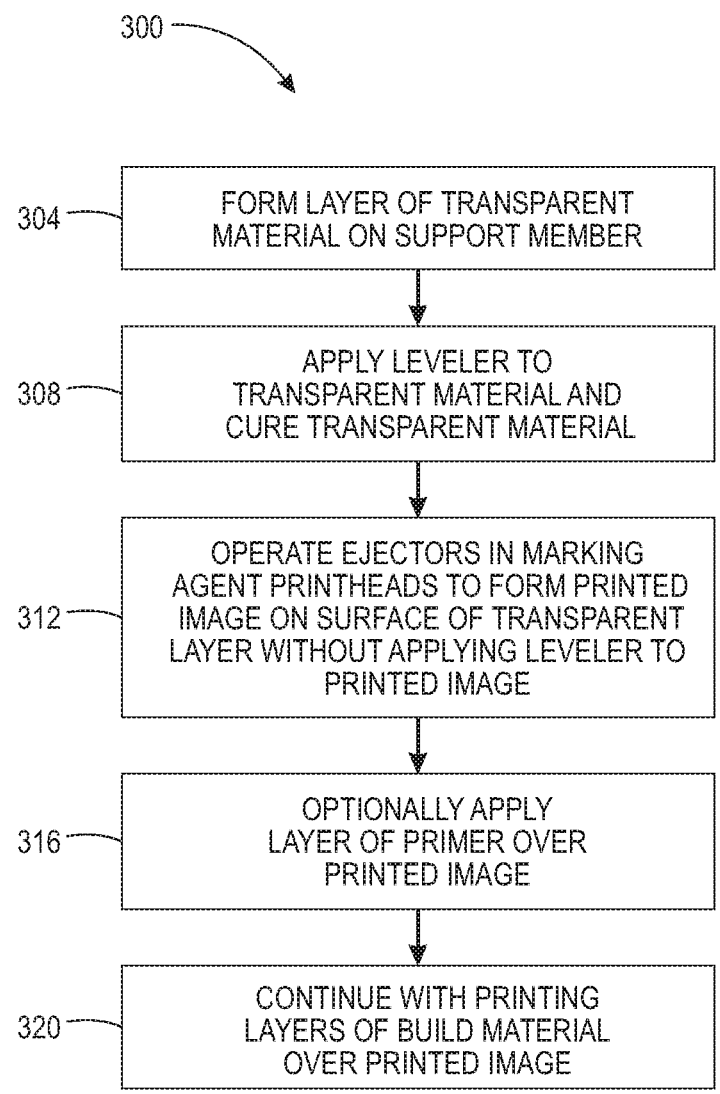
FIG. 3 is a block diagram of a process for operation of a three-dimensional object printer to form two-dimensional images with a protective layer on a bottom surface of a three-dimensional printed object.

In the process 200, the three-dimensional object printer 100 forms a two-dimensional printed image on a surface of a three-dimensional printed object. In some embodiments, the three-dimensional object printer 100 forms an image on a bottom surface of an object and forms the three-dimensional object over the printed image instead of forming the image on a surface of a previously printed three-dimensional object. FIG. 3 depicts a process 300 for forming a three-dimensional printed object with a two-dimensional image printed on a bottom surface of the object. In the discussion below, a reference to the process 300 performing an action or function refers to the operation of a controller to execute program instructions to perform the task or function in conjunction with other components in a three-dimensional object printer. The process 300 is described in conjunction with the printer 100 of FIG. 1 and the view of the printed object 150 in FIG. 4 for illustrative purposes.

Process 300 begins as the printer 100 forms a layer of transparent material on the surface of the support member 102 (block 304). In the printer 100, the controller 128 operates the printheads 106A-106C to form a layer of transparent material on the surface of the support member 102. In some configurations, the printheads 106A-106C form a thicker layer of transparent material during multiple passes of the support member 102 through the print zone 120. After completion of the process 300, the lower surface of the transparent material that engages the surface of the support member 120 may be polished, buffed, or otherwise smoothed during a finishing process. The finishing process may remove a portion of the transparent material, and the printer 100 optionally forms a thicker layer of transparent material to accommodate the finishing process. The printer 100 applies the leveler 172 to smooth the surface of transparent material prior to forming a printed image on the surface of the transparent layer that faces the printheads in the print zone 120 (block 308).

Process 300 continues as the printer 100 forms a printed image over the layer of transparent material without engaging the leveler to the marking agent in the printed image (block 312). In some configurations, the controller 128 inverts the two-dimensional image data 136 for the printed image so that text and other graphics appear to be arranged in an expected direction when viewed from the bottom of the completed three-dimensional printed object 150. The controller 128 operates the ejectors in the marking agent printheads 110A-110C to form the printed image in one or more passes over the layer of transparent material. The printer 100 does not apply the leveler 172 to the marking material that forms the printed image in a similar manner to the formation of the printed image during process 200. The printer 100 optionally cures the marking material with the UV curing device 112.

Process 300 continues as the printer 100 optional prints one or more layers of primer material over the surface of the printed image (block 316). The controller 128 operates the ejectors in the printhead array 108A-108C to form one or more layers of the primer material over the printed image. The printer 100 applies the leveler 172 and UV curing device to the primer material layer. Process 300 continues as the printer 100 prints layers of the build material over the layers of transparent material, the printed image, and the primer using the printheads 104A-104C (block 320). In some configurations, the printer 100 does not form a separate layer of primer material and the controller 128 forms one or more layers of the build material directly over the printed image. While printing the layers of build material, the printer 100 applies the leveler 172 to some or all of the layers of build material to maintain a uniform upper surface of the object 150 during the printing process. In some configurations, the printer 100 completes printing of the three-dimensional object 150 and performs the process 200 to form another printed image on an upper surface of the object 150.

Figure 4:
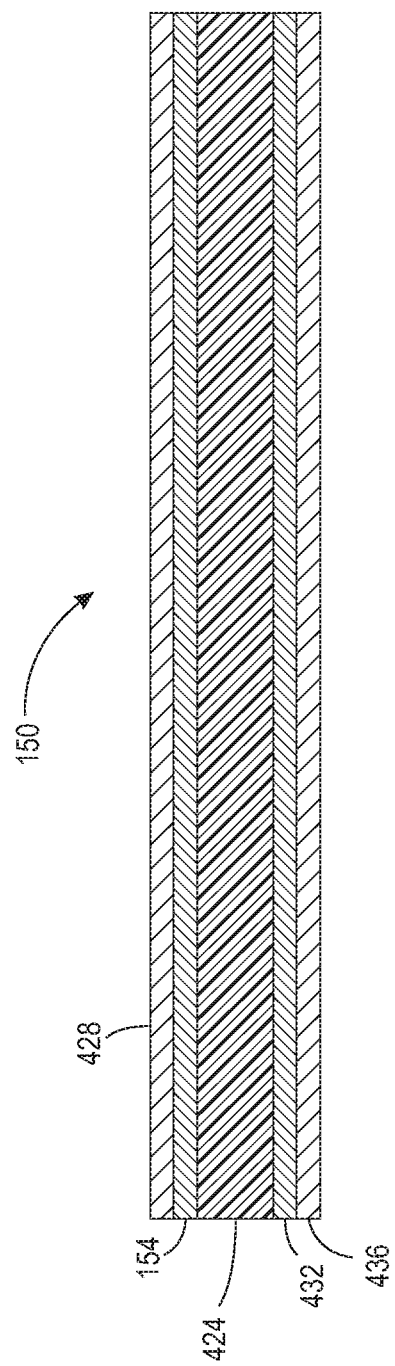
FIG. 4 is a cross-sectional view of a portion of a printed image formed on a surface of a three-dimensional printed object with a protective layer of transparent material.

FIG. 4 depicts the layers of material in the printed object 150 including an upper layer 424 that is formed from the build material or the primer material, the marking agent that forms the printed image 154, and the layer of transparent material 428. As described above, during the process 200, the leveler 172 is applied to the outer surface of the transparent material layer 428, but the printer 100 operates the actuator 124 to position the object 150 along the z-axis to prevent the surface of the leveler 172 from being applied to the marking agent in the printed image 154. FIG. 4 also depicts a printed image 432 that is formed on the bottom surface of the three-dimensional printed object 150. As described above, the printer 100 performs process 300 to form a layer of transparent material 436, the printer 100 then forms the printed image 432 over the transparent material layer 436 without applying the leveler 172 to the marking agent in the printed image 432. The printer 100 then applies an optional layer of primer material and continues printing build material 424 to form the object 150 over the printed image layer 432.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method of forming a three-dimensional printed object with a three-dimensional object printer comprising:
    operating with a controller a first plurality of ejectors to eject drops of a first material that is a non-transparent build material to form at least one layer of the first material on a support member;
    applying a leveler to a surface of the at least one layer of the first material after forming each layer of the at least one layer of the first material;
    operating with the controller a second plurality of ejectors to eject drops of a marking agent on the leveled surface of the at least one layer of the first material to form a printed image that includes text or graphics on the leveled surface of the at least one layer of the first material;
    operating with the controller a third plurality of ejectors to eject drops of a second material that is a transparent material over the printed image to form at least one layer of the second material over the printed image, the second material being different than the first material; and
    applying the leveler to a surface of the at least one layer of the second material without applying the leveler to the printed image before a first layer of the second material was formed over the printed image.

2. The method of claim 1, the operation of the first plurality of ejectors further comprising:
    operating the first plurality of ejectors with the controller to form the three-dimensional object with a plurality of layers of the build material.

3. The method of claim 2, the operation of the third plurality of ejectors further comprising:
    operating the third plurality of ejectors to form a single layer of transparent material over the printed image.

4. The method of claim 3 further comprising:
    operating with the controller a fourth plurality of ejectors to eject drops of a primer material onto the surface of the plurality of build layers prior to operating the second plurality of ejectors to form the printed image that includes text or graphics.

5. The method of claim 4 further comprising:
    operating with the controller an actuator to adjust a distance between the leveler and the surface of the plurality of build layers prior to operation of the second plurality of ejectors to prevent the leveler from being applied to the printed image.

6. The method of claim 5 further comprising:
    operating with the controller the actuator to adjust the distance between the leveler and the single layer of the transparent material after operation of the third plurality of ejectors to apply the leveler to the single layer of transparent material.

7. The method of claim 6 further comprising:
    operating with the controller a curing device to cure the transparent material after formation of the layer of transparent material over the printed image and after application of the leveler to the surface of the layer of transparent material.

8. A method of forming a three-dimensional printed object with a three-dimensional object printer comprising:
    operating with a controller a first plurality of ejectors to eject drops of a first material is a transparent material to form at least one layer of the first material on a support member;
    applying a leveler to a surface of the at least one layer of the first material after forming each layer of the at least one layer of the first material;
    operating with the controller a second plurality of ejectors to eject drops of a marking agent on the leveled surface of the at least one layer of the first material to form a printed image that includes text or graphics on the leveled surface of the at least one layer of the first material;
    operating with the controller a third plurality of ejectors to eject drops of a second material that is a non-transparent build material over the printed image to form at least one layer of the second material over the printed image, the second material being different than the first material; and
    applying the leveler to a surface of the at least one layer of the second material without applying the leveler to the printed image before a first layer of the second material was formed over the printed image.

9. The method of claim 8, the operation of the first plurality of ejectors further comprising:
    operating the first plurality of ejectors with the controller to form a single layer of the transparent material on the support member.

10. The method of claim 9, the operation of the second plurality of ejectors further comprising:
    operating the second plurality of ejectors with the controller to form the printed image on a surface of the single layer of the transparent material.

11. The method of claim 10, the operation of the third plurality of ejectors further comprising:
    operating the third plurality of ejectors to form at least one layer of build material over the printed image.

12. The method of claim 11 further comprising:
    operating with the controller a fourth plurality of ejectors to eject drops of a primer material onto the printed image prior to operating the third plurality of ejectors.

13. The method of claim 12 further comprising:
operating with the controller an actuator to adjust a distance between the leveler and the layer of transparent material on the support member prior to operation of the second plurality of ejectors to prevent the leveler from being applied to the printed image.

14. The method of claim 13 further comprising:
operating with the controller the actuator to adjust the distance between the leveler and the at least one layer of the build material formed over the printed image after operation of the third plurality of ejectors to apply the leveler to a surface of the at least one layer of build material.

* * * * *